US011112530B2

(12) United States Patent
Ferderer et al.

(10) Patent No.: US 11,112,530 B2
(45) Date of Patent: Sep. 7, 2021

(54) GLOBAL INVERSION OF GRAVITY DATA USING THE PRINCIPLE OF GENERAL LOCAL ISOSTASY FOR LITHOSPHERIC MODELING

(71) Applicants: Robert J. Ferderer, The Woodlands, TX (US); John Mariano, Houston, TX (US)

(72) Inventors: Robert J. Ferderer, The Woodlands, TX (US); John Mariano, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 433 days.

(21) Appl. No.: 15/788,440

(22) Filed: Oct. 19, 2017

(65) Prior Publication Data
US 2018/0128940 A1    May 10, 2018

Related U.S. Application Data

(60) Provisional application No. 62/417,400, filed on Nov. 4, 2016.

(51) Int. Cl.
*G06F 17/10* (2006.01)
*G01V 99/00* (2009.01)

(52) U.S. Cl.
CPC ............ *G01V 99/005* (2013.01); *G01V 99/00* (2013.01)

(58) Field of Classification Search
CPC .................................. G01V 7/00; G01V 99/00
See application file for complete search history.

(56) References Cited

U.S. PATENT DOCUMENTS

| 5,615,114 A | 3/1997 | Nordin |
| 6,278,948 B1 | 8/2001 | Jorgensen et al. |
| 6,615,139 B1 | 9/2003 | Chakravarthi |
| 7,941,307 B2 | 5/2011 | Symington et al. |
| 8,938,373 B2 | 1/2015 | Wienecke |
| 2009/0234625 A1* | 9/2009 | Zangl ..................... E21B 49/00 703/10 |

(Continued)

OTHER PUBLICATIONS

Close Isostasy and Gravity Modelling: Integrating Potential Field Data in Interpretation Workflows CSEG Recorder, Jun. 2010 (Year: 2010).*

(Continued)

*Primary Examiner* — Rehana Perveen
*Assistant Examiner* — Cuong V Luu
(74) *Attorney, Agent, or Firm* — ExxonMobil Upstream Research Company, Law Department (57) ABSTRACT

A method including: defining a model space within which all subsurface models are in general local isostatic equilibrium; generating a representative set of trial models which span the model space, wherein a requirement that all of the trial models be in isostatic equilibrium provides a constraint that narrows a range of solutions that fit observed gravity data, wherein the trial models provide scenarios of Earth's crustal geometry, and crust and mantle rock properties; and determining, within an inversion process, a model solution based on minimizing a misfit between the observed gravity data and synthetic gravity data generated from at least one of the trial models.

16 Claims, 9 Drawing Sheets

(56) References Cited

U.S. PATENT DOCUMENTS

| | | | |
|---|---|---|---|
| 2014/0064604 A1* | 3/2014 | Jiang | G06K 9/00201 382/154 |
| 2014/0350905 A1 | 11/2014 | Wenecke et al. | |
| 2016/0209544 A1 | 7/2016 | Minguez et al. | |

OTHER PUBLICATIONS

Robert Tenzer Inverse Problem for the Gravimetric Modeling of the Crust-Mantle Density Contrast Contributions to Geophysics and Geodesy, vol. 42/2, 2013 pp. 83-98 (Year: 2013).*

Gaunch et al. Model Evaluation by Comparison of Model-Based Predictions and Measured Values American Society of Agronomy, pp. 1442-1446 (Year: 2003).*

Bagherbandi An Istostatic EarthCrustal Model and its Applications Royal Institute of Technology, Apr. 2011 (Year: 2011).*

Kaban et al. A New Isostatic Model of The Lithosphere and Gravity Field Journal of Geodesy 78, 2004, pp. 368-385 (Year: 2004).*

Weidmann et al. Crustal Structure and Tectonic Setting of the South Central Andes from Gravimetric Analysis Geofisica Internacional 52-3, 2013, pp. 197-208 (Year: 2013).*

Ron Hackney Gravity Anomalies, Crustal Structure and Isostasy Associated With The Proterozoic Capricorn Orogen, Western Australia Precambrian Research 128, 2004, pp. 219-236 (Year: 2004).*

Salem et al. Inversion of Gravity Data with Isostatic Constraints Geophysics, vol. 79, No. Nov. 6, 2014 (Year: 2014).*

Ortiz et al. 3DINVER.M: a Matlab Program to Invert the Gravity Anomaly Over a 3D Horizontal Density Interface by Parker-Oldenburg's Algorithm Computers & Geosciences 31,2005 pp. 513-520 (Year: 2005).*

Anbaran et al. Crustal and Lithosperic Structure of The Alborz Mountains, Iran, and Surrounding Areas From Integrated Geophysical Modeling Tectonics, vol. 30, TC5012, 2011 (Year: 2011).*

Slingerland et al. Simulating Clastic Sedimentary Basins—Chapter 2 Prentice Hall Englewood Cliffs, Feb. 26, 2015 (Year: 2015).*

Li, X, and Chouteau, M., 1998, "Three-dimensional gravity modeling in all space", *Surveys in Geophysics* 19; pp. 339-368.

Sen, M. and Stoffa, P.L., 1995, Global optimization methods in geophysical inversion, Advances in Exploration Geophysics 4, Elsevier Science B.V.; preface—pp. ix-xi, Chapter 2 pp. 23-71.

Watts, A.B., 2001, Isostasy and Flexure of the Lithosphere, Cambridge University Press; Chapters 1 & 2 pp. 1-86 , Chapters 4 & 5 pp. 113-221.

* cited by examiner

$$g = -G\rho \sum_{i=1}^{2}\sum_{j=1}^{2}\sum_{k=1}^{2} \mu_{ijk}$$

$$\times \left[ x_i \ln(y_j + r_{ijk}) + y_j \ln(x_i + r_{ijk}) - z_k \arctan\frac{x_i y_j}{z_k r_{ijk}} \right]$$

where $$x_i = x - \xi_i, \; y_j = y - \eta_j, \; z_k = z - \zeta_k,$$

$$r_{ijk} = \sqrt{x_i^2 + y_j^2 + z_k^2}$$

and $$\mu_{ijk} = (-1)^i (-1)^j (-1)^k$$

GLOBAL INVERSION OF GRAVITY DATA USING THE PRINCIPLE OF GENERAL LOCAL ISOSTASY FOR LITHOSPHERIC MODELING

CROSS-REFERENCE TO RELATED APPLICATION

This application claims the benefit of U.S. Provisional Patent Application 62/417,400 filed Nov. 4, 2016 entitled GLOBAL INVERSION OF GRAVITY DATA USING THE PRINCIPLE OF GENERAL LOCAL ISOSTASY FOR LITHOSPHERIC MODELING, the entirety of which is incorporated by reference herein.

TECHNOLOGICAL FIELD

Exemplary embodiments described herein pertain to geophysical prospecting. More specifically, exemplary embodiments described herein pertain to a method of inverting gravity anomaly data for depth to the top or base of the earth's crust, as well as for densities of the crust and mantle, by imposing general local isostasy.

BACKGROUND

This section is intended to introduce various aspects of the art, which may be associated with exemplary embodiments of the present technological advancement. This discussion is believed to assist in providing a framework to facilitate a better understanding of particular aspects of the technological advancement. Accordingly, it should be understood that this section should be read in this light, and not necessarily as admissions of prior art.

Understanding of the structure of the earth's continental margins has improved significantly since the advent of deep-water hydrocarbon exploration in the late 20th century due largely to the availability of deep seismic reflection (>10 s record length) and refraction data. It has become clear that being able to determine the geometry, type, and age of Earth's crust, as well as the thermal state of the mantle below it, are key to predicting whether a working hydrocarbon systems is present. Deep seismic reflection and refraction data can provide constraints on the geometry of the crust as well as on crustal type through velocity information. These seismic data sometimes image both the top and base of the crust, but in many cases image only the top, only the base, or neither surface. Deep seismic reflection and refraction data are typically available along widely-spaced profiles and entire basins often lack coverage. Gravity and isostatic methods are also used, individually or together, to model crustal geometry by assuming that sediment, crust, and mantle densities are known (Watts, 2001). These non-seismic methods are sometimes used in conjunction with seismic data to create integrated lithospheric models and are useful in areas where deep seismic reflection and refraction data do not exist.

Local Isostasy

Figure 1A:
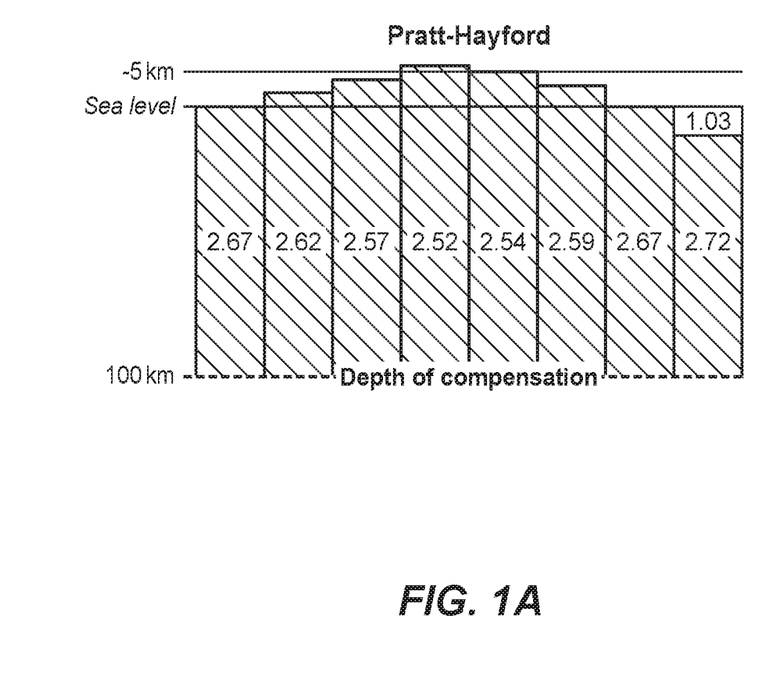
FIG. 1A illustrates the Pratt-Hayford theory of local isostasy.
Figure 1B:
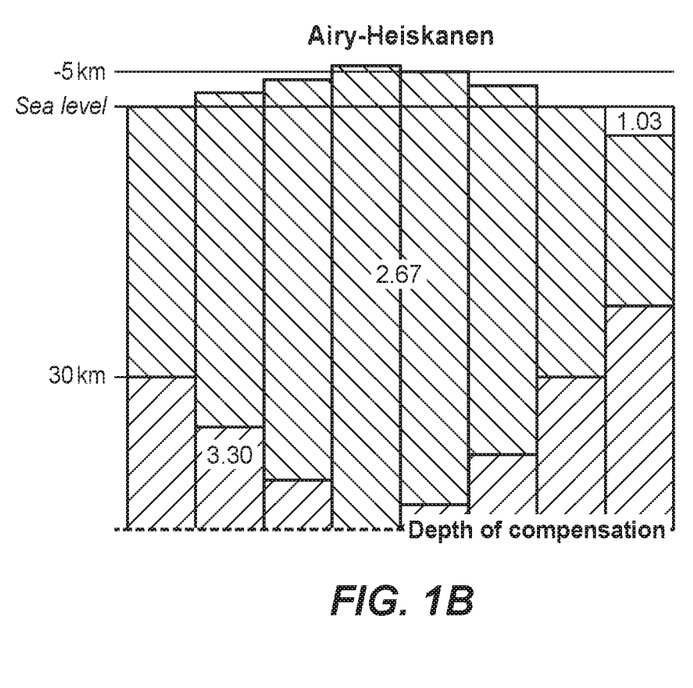
FIG. 1B illustrates the Airy-Heiskanen theory of local isostasy.

The principle of local isostasy states that for all points which lie along a compensation surface within the mantle, the pressure exerted by overlying water, sediment, crust, and mantle is constant. The depth of the compensation surface is constant, as is the total integrated mass vertically above the surface at each point. Where these conditions are met, the earth is said to be in a state of local isostatic equilibrium. For local isostasy to operate, the lithosphere is assumed to have no rigidity. Two theories of local isostasy have existed since the first half of the 20th century. These are the Pratt-Hayford and Airy-Heiskanen theories of local isostasy (FIGS. 1A and 1B). For the Airy-Heiskanen theory, the density of Earth's crust is constant and the depth to the base of the crust varies. Isostatic equilibrium is achieved as the thickness of the mantle between the base of the crust and the depth of compensation varies, counteracting the mass variations associated with variable topography. For the Pratt-Hayford theory, the depth of compensation is flat. As topography varies, constant pressure at the depth of compensation is achieved by varying crustal densities. See Watts, 2001 for a detailed discussion of the history of the Pratt-Hayford and Airy-Heiskanen theories of local isostasy.

SUMMARY

A method including: defining a model space within which all subsurface models are in general local isostatic equilibrium; generating a representative set of trial models which span the model space, wherein a requirement that all of the trial models be in isostatic equilibrium provides a constraint that narrows a range of solutions that fit observed gravity data, wherein the trial models provide scenarios of Earth's crustal geometry, and crust and mantle rock properties; and determining, within an inversion process, a model solution based on minimizing a misfit between the observed gravity data and synthetic gravity data generated from the trial models.

In the method, the generation of the representative set of trial models can include: creating a lithospheric column that is in general local isostatic equilibrium; and calculating a gravity anomaly for the lithospheric column.

In the method, a lithospheric column can include a water layer, a sediment layer, a crustal layer, and a mantle layer. The water layer, the sediment layer, the crustal layer, and the mantle layer are each formed of prisms, and calculating the gravity anomaly for the lithospheric column can include determining a gravity anomaly produced by each prism within the lithospheric column and summing all of the gravity anomalies produced by all prisms in all columns.

In the method, the lithospheric column can be an offshore lithospheric column.

In the method, the lithospheric column can be an onshore lithospheric column.

In the method, crust thickness, densities for crust sublayers and zones, densities for mantle zones, thickness of a reference crust, and density of the reference crust can be solved for during the inversion process.

In the method, a thickness of the sedimentary section of the Earth, densities for crust sublayers and zones, densities for mantle zones, thickness of a reference crust, and density of the reference crust are solved for during the inversion process.

The method can further include determining lateral density contrasts in Earth's crust and mantle.

In the method, the inversion process, for the trial models, can include calculating the synthetic gravity anomaly for each of the trial models, determining a root mean square difference between the synthetic gravity anomalies and the observed gravity anomaly, and using the difference to rank the trial models.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

By combining the gravity method with principles of general local isostasy in a global inversion algorithm, the present technological advancement can produce lithospheric models which both "best-fit" observed gravity data and obey isostatic principles. The present technological advancement can provide simultaneous estimates of both crustal geometry, in the form of depth to the top or base of the crust, and crust and mantle rock properties, in the form of specific crustal and mantle densities. The implementation of general local isostasy in the present technological advancement, which allows crustal geometry and lateral crust and mantle density changes to be solved for, would not be possible using the Airy and Pratt methods of local isostasy. Further, by requiring that all trial models be in general local isostatic equilibrium, the present technological advancement decreases the size of the family of geologically reasonable solutions which fit the gravity data. This translates into an improvement in how a computer implementing the present technological advancement is able to accurately characterize the geology of interest. Finally, in addition to solving for specific crustal densities and depth to the top or base of the crust, the present technological advancement allows the theoretical reference crustal thickness and reference crustal density (see below), which are typically poorly constrained, to be solved for.

General Local Isostasy

The present technological advancement builds upon a new theory of general local isostasy (GLI). With GLI, crust and mantle densities as well as the depth to the top and base of the crust may vary laterally while local isostatic equilibrium is maintained. General local isostasy is more versatile than either Airy-Heiskanen or Pratt-Hayford local isostasy, allowing for more realistic modeling of lithospheric structure. This is because major changes in crustal type (and hence crustal density) commonly exist along continental margins. Continental crust typically consists of crustal domains which were sutured together during Precambrian or Paleozoic time and all of these domains, as well as the suture material itself, may have variable rock properties. Similarly, as part of the continental break-up process, different crustal domains have formed, including: magmatic edifices, seaward dipping reflectors, and exhumed and serpentinized mantle, etc. All of these domains may have different rock properties.

By combining gravity modeling and the principle of general local isostasy in a global inversion algorithm, the present technological advancement can produce realistic lithospheric models which both "best-fit" observed gravity data and obey isostatic principles, providing solutions which are more reliable than those obtained using either gravity data or isostatic principles alone.

Figure 2:
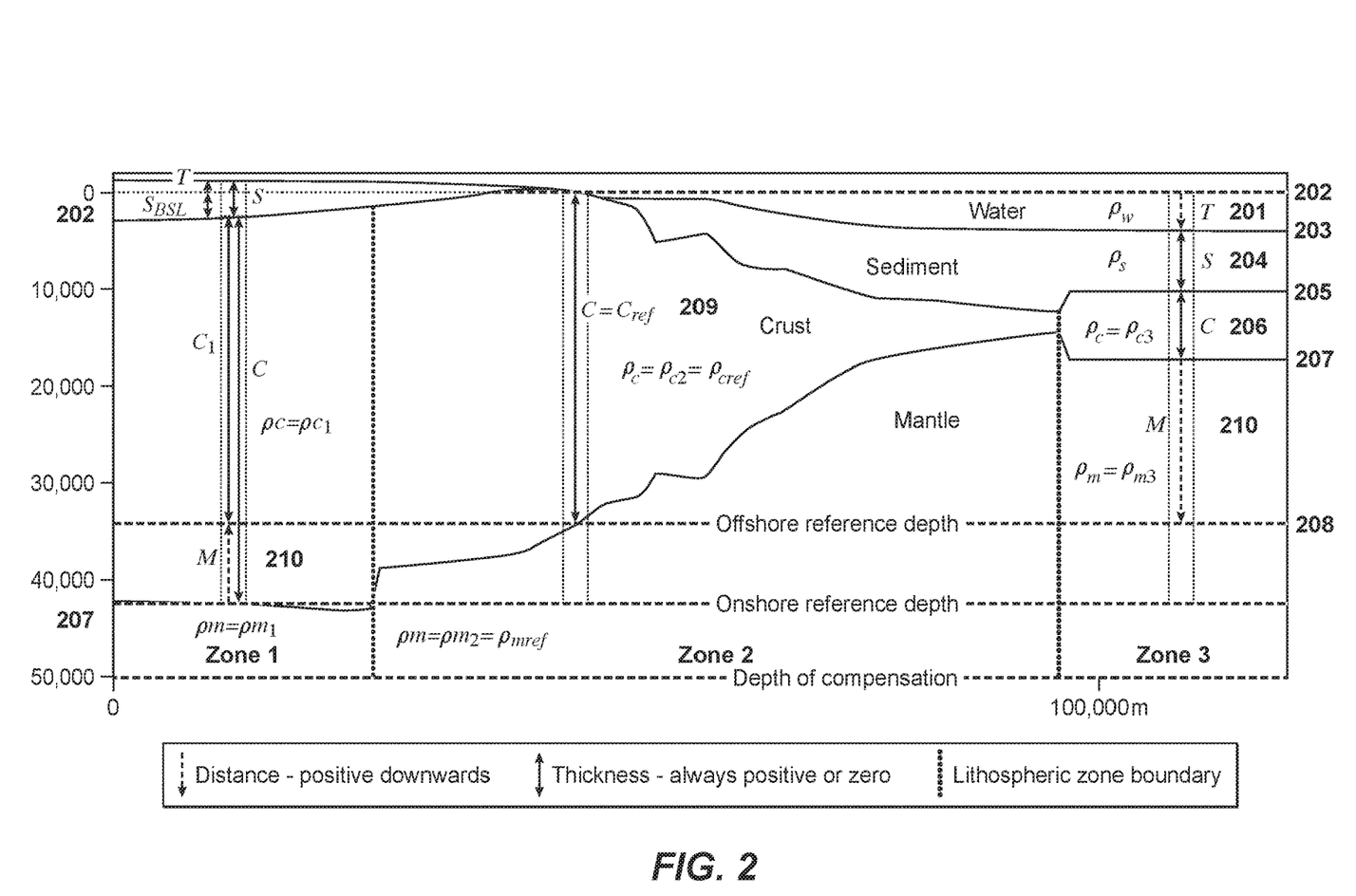
FIG. 2 illustrates a cross-section through a hypothetical continental margin.

Consider a cross-section through a hypothetical continental margin (FIG. 2). Local isostatic calculations are typically performed relative to a theoretical reference location where elevation=0, sediment thickness=0, and the density and thickness of the earth's crust as well as the density of the mantle are assumed known. In practice these conditions need not physically exist in an area being modeled (there may be no actual location where elevation=0, or, sediments may be present at an actual location where elevation=0). The example shown in FIG. 2 is comprised of three lithospheric zones (1, 2, and 3), each having different crust and mantle densities. Consider three columns of rock/water with one column in each zone. Zone 1 is entirely onshore, zone 2 contains both onshore and offshore locations, and zone 3 is entirely offshore. For purposes of illustration, the geology of the column in zone 2 has been made consistent with that of a theoretical reference location. The principle of local isostasy is invoked by setting the total mass above a reference depth at the theoretical reference location equal to the total mass above the same depth at an arbitrary onshore or offshore location. For the onshore case, the reference depth is the depth of the base of the crust at the onshore location. For the offshore case, the reference depth is the depth of the base of the crust at the theoretical reference location which is by definition equivalent to the reference crustal thickness Cref.

By convention, all elevations are positive downwards relative to sea level. T 201 is the vertical distance between sea level 202 and the rock surface 203 and is positive offshore and negative onshore. S is the vertical thickness of the sedimentary section 204 which lies between the rock surface 203 and the top of the crust 205. C is the vertical thicknesses of the crust 206 which lies between the top 205 and base 207 of the crust. Cref 209 is the thickness of the crust at the reference location. M 210 is the vertical distance between the base of the crust 207 at any location and the depth to the base of the crust at the reference location 208. M is positive offshore and typically negative onshore. SBSL is the thickness of onshore sediments below sea level 202, and C1 is the thickness of onshore crust above the depth to the base of the crust at the reference location 208. $\rho w$, $\rho s$, $\rho c$, and $\rho m$ are densities of water, sediment, crust and mantle, respectively. $\rho cref$ and $\rho mref$ are the densities of the crust and mantle, respectively, at the theoretical reference location.

Given a value of S, GLI is used to solve for C, or alternatively, given a value of C, GLI is used to solve for S. This is done differently depending on whether a location of interest is onshore or offshore. The following section contains a derivation of the equations which constitute GLI.

Derivation of General Local Isostasy

Onshore Case

The total mass above the base of the crust at an onshore location is set equal to the total mass above the same depth at the reference location, $$C_{ref}\rho_{cref} - M\rho_{mref} = S\rho_s + C_1\rho_c - M\rho_c. \quad (1)$$

Writing $C_1$ in terms of $C_{ref}$, $$C_1 = C_{ref} - SBSL \text{ where } SBSL = T + S. \quad (2)$$

Substituting (2) into (1), $$C_{ref}\rho_{cref} - M\rho_{mref} = S\rho_s + (C_{ref} - T - S)\rho_c - M\rho_c$$

or, $$M = [C_{ref}(\rho_{cref} - \rho_c) + T\rho_c - S(\rho_s - \rho_c)]/(\rho_{mref} - \rho_c). \quad (3)$$

Now, because $$C = C_1 - M,$$

$$C = C_{ref} - T - S - [C_{ref}(\rho_{cref} - \rho_c) + T\rho_c - S(\rho_s - \rho_c)]/(\rho_{mref} - \rho_c). \quad (4)$$

Alternatively, from (3)

$$S = [C_{ref}(\rho_{cref} - \rho_c) + T\rho_c - M(\rho_{mref} - \rho_c)]/(\rho_s - \rho_c) \quad (5)$$

Offshore Case

The total mass above the base of the crust at the reference location is set equal to the total mass above the same depth at an offshore location, $$C_{ref}\rho_{cref} = T\rho_w + S\rho_s + C\rho_c + M\rho_m. \quad (6)$$

Writing C in terms of $C_{ref}$, $$C = C_{ref} - T - S - M. \quad (7)$$

Substituting (7) into (6)

$$C_{ref}\rho_{cref} = T\rho_w + S\rho_s + (C_{ref} - T - S - M)\rho_c + M\rho_m.$$

or, $$M = [C_{ref}(\rho_{cref} - \rho_c) - T(\rho_w - \rho_c) - S(\rho_s - \rho_c)]/(\rho_m - \rho_c) \quad (8)$$

Substituting (8) into (7) gives:

$$C = C_{ref} - T - S - [C_{ref}(\rho_{cref} - \rho_c) - T(\rho_w - \rho_c) - S(\rho_s - \rho_c)]/(\rho_m - \rho_c). \quad (9)$$

Alternatively, from (8)

$$S = [C_{ref}(\rho_{cref} - \rho_c) - T(\rho_w - \rho_c) - M(\rho_m - \rho_c)]/(\rho_s - \rho_c) \quad (10)$$

Equations (4) and (9) are used to calculate crustal thickness, C, when sediment thickness is known, and equations (5) and (10) are used to calculate sediment thickness, S, when depth to the base of the crust is known. In practice, for equations (4) and (9), input S values are obtained through interpretation of seismic data as well as from well and surface geology data, etc. Similarly, for equations (5) and (10), input M values can sometimes be obtained from seismic refraction or deep seismic reflection data.

These GLI equations allow geologic models that are complex enough to represent real earth situations where crustal and mantle densities vary laterally and the depth to the base of the crust is variable. Neither the Airy-Heiskanen nor Pratt-Hayford models of local isostasy can handle these complexities.

Application of GLI

The present technological advancement can apply GLI within a global inversion strategy to solve for parameters of geologically realistic lithospheric models that are in isostatic equilibrium and "best-fit" observed gravity data. This is accomplished by defining a model space within which all models are in general local isostatic equilibrium and then evaluating a representative set of trial models which span the model space. The requirement that all trial models be in isostatic equilibrium provides a constraint which narrows the range of acceptable solutions that fit observed gravity data and hence decreases the impact of non-uniqueness on gravity modeling. This constraint can improve the computer's ability to solve for accurate solutions to the inversion problem. The goal of the inversion is to identify the isostatically-balanced trial model which is associated with the global minimum in the misfit between observed and calculated gravity anomalies. This trial model is deemed the "best-solution" (best set of parameters). Alternatively, a "best-solution" can be formed by applying statistical analysis to trial model misfits. For example, mean or median parameter values for the NSOL (defined below) solutions with the smallest misfit values can be used to form the "best-solution". Standard deviations of the best NSOL solutions provide information regarding the robustness or clustering of solutions. For the purposes of the following discussion, we define misfit as the root-mean-square difference between observed and calculated gravity anomalies (RMSD). However, the present technological advancement can utilize other methods of determining misfit.

Trial models used during the inversion process can include a water layer (offshore), a sediment layer (including vertical density variations), a crustal layer (including lateral and vertical density variations), and a mantle layer (including lateral density variations). The locations of lateral and vertical density changes can be specified by the user. Sublayers within the sediment and crustal layers are useful for gravity modeling because they allow for representation of vertical density variations which typically occur in nature. Sublayers are not useful for isostatic modeling because only the bulk densities of the primary layers are required. Bulk densities can be calculated using a weighted average of sublayer densities (weighted by layer thickness) so that bulk and sublayer densities are consistent. Sublayers are not used for the water and mantle layers because there is no perceived benefit to doing so.

A lithospheric zone is a combination of a crust and mantle zone. In most cases, the density of the mantle is considered to be uniform and is held constant. In such cases, lithospheric zones consist of crustal zones which sit on top of a homogeneous mantle. In some cases, particularly when thermal effects associated with tectonic extension or volcanism are present, both the crust and mantle are partitioned by zone boundaries so that both crust and mantle densities within lithospheric zones may be variable.

Figure 3:
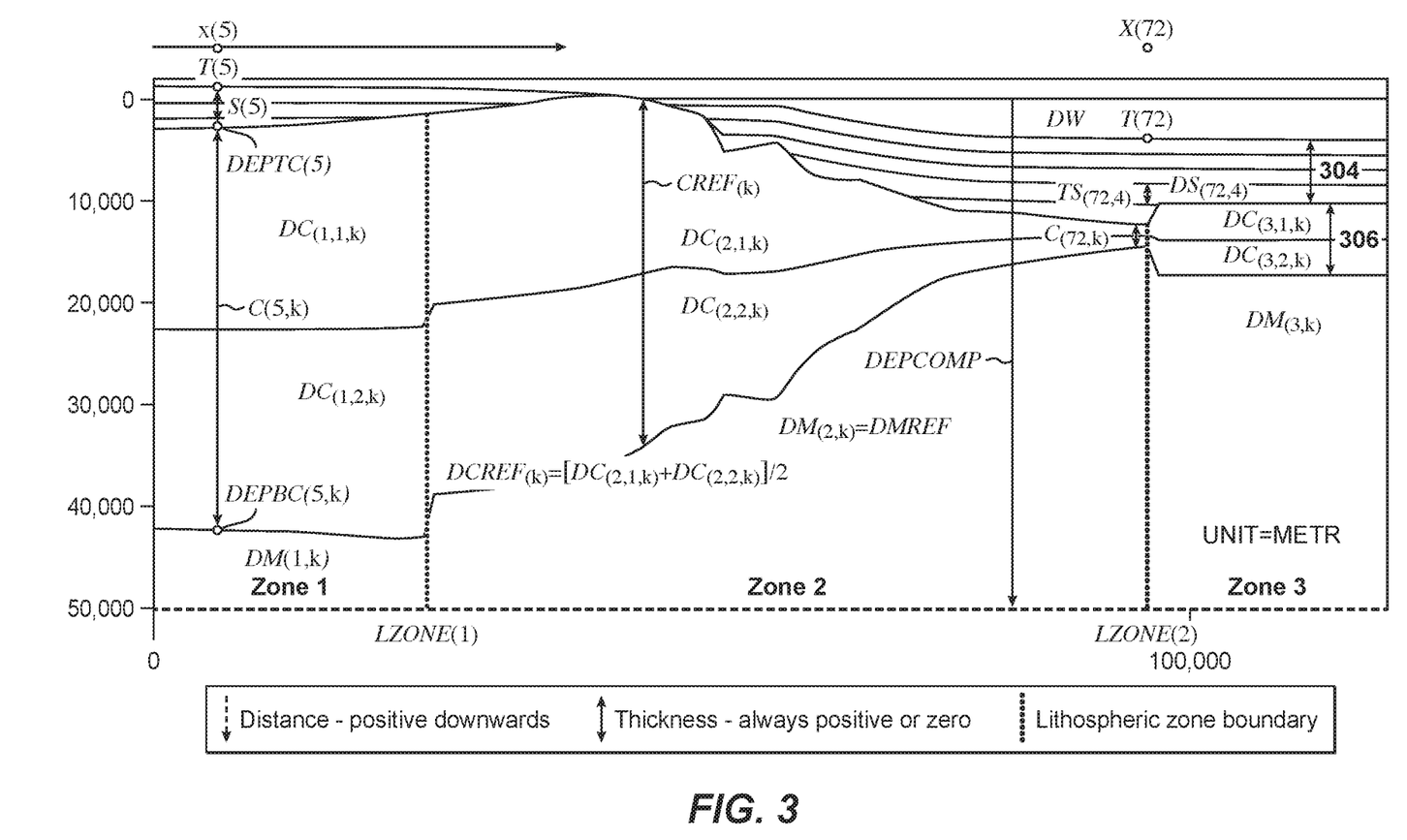
FIG. 3 illustrates a cross-section through a hypothetical continental margin, which is labeled with parameters useable with the present technological advancement.

FIG. 3 illustrates a cross-section through a hypothetical continental margin, which is labeled with parameters useable with the present technological advancement. In FIG. 3, relative to FIG. 2, sedimentary layer 304 and crustal layer 306 are broken into sublayers to improve realism for gravity calculations. Variables x, y, and z are Cartesian coordinates where x is distance along a profile, y is perpendicular to the profile, and z is depth below sea level. Indices used for model parameterization (see FIG. 3) include:

i=index for a lithospheric, crustal, or mantle zone;
j=index for sublayers within a sediment or crustal layer; and
k=index for trial values of a specific parameter. For example, if the first trial density for the second sublayer in the third crustal zone is 2.90 g/cm$^3$, then DC(i,j,k)=DC(3,2,1)=2.90.

Inputs into a method embodying the present technological advancement can include:
1) G(x,z)=Observed gravity anomaly, either free-air or Bouguer, measured along a profile at locations x and elevations z;
2) T(x)=Topography (positive offshore and negative onshore) measured at locations x along a profile;
3) DEPTC(x)=Depth to the top of the crust measured at locations x along a profile if crustal thickness, C, is being solved for;
4) DEPBC(x)=Depth to the base of the crust measured at locations x along a profile if sediment thickness, S, is being solved for;
5) SAMPX=Sampling interval to be used for resampling 1), 2), and 3) or 4). After resampling, NPNT data points, separated by a distance of SAMPX, will exist;
6) LZONE(i)=Locations, x, of lithospheric, crustal, or mantle zone boundaries along a profile. These boundaries are used to assign crust and mantle densities to NZONE different zones in trial models;
7) DW=Density of water;
8) DS(j)=Densities to be used for sublayers within the sediment layer;
9) TS(j)=Thicknesses to be used for sublayers within the sediment layer;
10) DC(i,j,k)=Trial densities for crust sublayers. NDC(i,j)=number of trial crustal densities for sublayer j in zone i;
11) DM(i,k)=Trial densities for mantle zones. NDM(i)=number of trial mantle densities in zone i;
12) DEPCOMP=Depth of isostatic compensation. Must be below the deepest point on the base of the crust;
13) REFOP=Reference option. REFOP=1 indicates that the thickness of the reference crust is theoretical and corresponds to a hypothetical location where T=0 and S=0. REFOP=2 indicates that the actual thickness of the crust is known at some location within the model and will be used to calculate the reference crustal thickness (see 14 and 15);
14) LREF=Location, x, along the profile where the actual thickness of the crust is known. LREF is only specified if REFOP=2;
15) CREF(k)=Thickness of the reference crust. If REFOP=1, CREF is a theoretical crustal thickness which may have a single value or be solved for during inversion. If REFOP=2, CREF has a single value which is the actual thickness of the crust at location LREF.

The value of CREF is then used along with values of T, DEPTC (or DEPBC), DW, DS, DC, and DM at location LREF to calculate the total mass of material between Earth's surface and DEPCOMP. This mass and an assigned or trial reference crustal density, DCREF, are then used to calculate a reference crustal thickness CREF1 which is equivalent to a value of CREF for the case of REFOP=1. CREF1 is then used as if it were CREF and REFOP=1. Alternatively, input may consist of the thickness of the sediment layer, SREF, at one control location, and a similar procedure is followed;

16) DCREF(k)=Reference crustal density. If the maximum value of k for DCREF is 1, DCREF is an assigned value. If the maximum value of k for DCREF is >1, then DCREF is solved for during the inversion. DCREF values may also be taken directly from the crustal densities of a specified zone;
17) DMREF=Reference mantle density; and
18) NSOL=Maximum number of solutions with the lowest RMSD values that will be used for statistical analysis.

Methods embodying the present technological advancement can output model parameters that are solved for during inversion, including C, DC, DM, CREF and DCREF. DEPBC is computed with knowledge of DEPTC and C. Alternatively, S, DC, DM, CREF, and DCREF can be solved for, in which case DEPTC is computed with knowledge of T and S.

Exemplary Method

For purposes of the following discussion, a case is considered where depth to the top of the crust DEPTC is input and S is computed using T and DEPTC. C is then solved for using equations 4) and 9), and DEPBC is computed with knowledge of DEPTC and C.

While the following example is described in two-dimensional space, the concepts are equally applicable in three-dimensional space.

Figure 9:
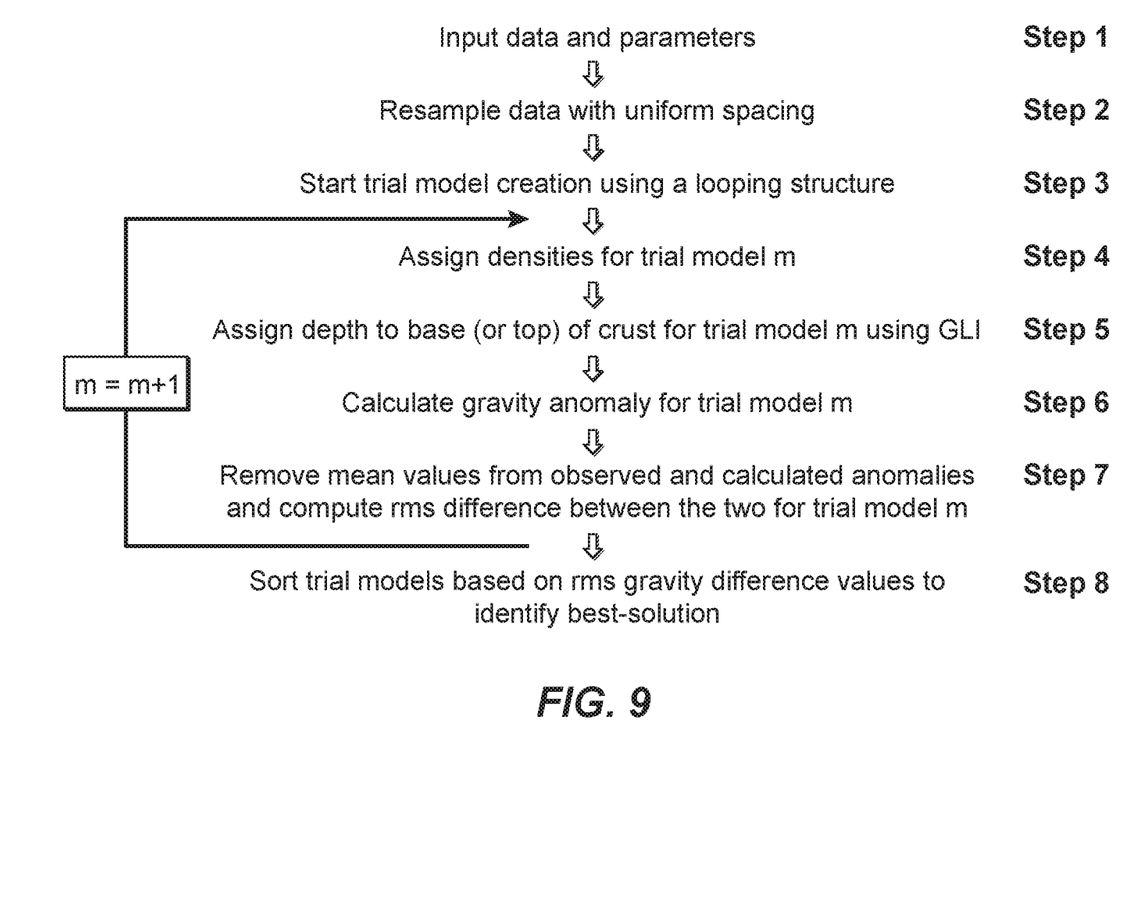
FIG. 9 illustrates an exemplary method embodying the present technological advancement.

FIG. 9 illustrates an exemplary method of the present technological advancement.

In step 1, all data and parameters are input.

In step 2, using sampling interval SAMPX, resample inputs: G, T, and DEPTC at NPNT equally spaced locations which are indexed by the value n. These inputs may initially be sampled at different locations and this step interpolates the inputs as necessary so that they are sampled at the same locations with a uniform interval. The sampling interval SAMPX can be chosen by those of ordinary skill in art for particular applications as it is a balance of computation time vs. accuracy. G(x), T(x), and DEPTC(x) become G(n), T(n), and DEPTC(n), respectively, when resampled where n=1, 2, 3, . . . , NPNT. Step 2 can also include determining which values of n are associated with zone boundaries, located at LZONE, so that the value of n can be used to assign crust and mantle densities during trial model creation.

In step 3, a series of imbedded loops are applied to create trial models such that each trial model has a unique set of parameter values. This step can generate trial models with a wide range of parameter values. For example, the parameters shown in the pseudo code below, CREF, DCREF, DC, and DM, can each be given a plurality of values. Trial parameter values can be assigned based on knowledge of the surrounding geology and fall within expected ranges of values. Each specific parameter value is associated with a specific loop and loop index value. The total number of trial models evaluated during the inversion is NTRIALS which is equal to the value of ntrial when execution of all loops has completed. A pseudocode representation of the algorithm is as follows:

```
Create index for the trial model
ntrial = 0
Loop through trial model parameters, assigning values to the parameters
for 1: Number of CREF values
for 1: Number of DCREF values
for 1: Number of DC(1,1) values
for 1: Number of DC(1,2) values
.
.
.
for 1: Number of DC(NZONE, 1) values
for 1: Number of DC(NZONE, 2) values
for 1: Number of DM(1) values
.
.
.
for 1: Number of DM(NZONE) values
Increment the trial model index. The trial model consists of the set of parameter
values which correspond to the loop indices
ntrial = ntrial + 1
Create the trial model itself by looping through each point along the profile and
assigning parameters to prisms which make up the lithospheric columns
In step 4, determine which zone each column (see, for example, the column in FIG. 4) is
located in and assign densities to the column's prisms accordingly. There is one column
for each point.
In step 5, compute and assign the depth of the base of the crust, DEPBC(n), for each column
using GLI equations 4 and 9, and the densities of the column's prisms from step 4.
At this point, the trial model is fully parameterized
In step 6, calculate the gravity anomaly CALG(n) at each point along the profile by
summing the gravity effect of each prism within each column of the model. (this step is
further discussed below)
Compute the RMSD value for the trial model
In step 7, mean values of the observed (OBSG) and calculated (CALG) gravity anomalies
along the profile are calculated and subtracted from the individual CALG and OBSG values
so that the observed and calculated anomalies have a common datum.
The root-mean-square difference, RMSD, of the OBSG and CALG values is then
calculated and stored along with the associated model parameters.
end
end
end
end
.
.
.
end
end
end
.
.
.
end
```

At this point, all trial models have been created and are associated with RMSD values.

In step 8, all trial model parameter sets are sorted and ranked based on the value of RMSD. The "best solution" can be defined as the set of trial model parameters that is associated with the smallest value of RMSD. Alternatively, some number of solutions, NSOL, with the smallest RMSD values can be selected and the "best solution" can be defined as a model created using the mean or median, etc., of the parameter values for the NSOL solutions. Standard deviations of the NSOL solutions with the smallest RMSD values can be used to evaluate the robustness or clustering of the solutions.

Detailed Discussion of Step 5

Figure 4:
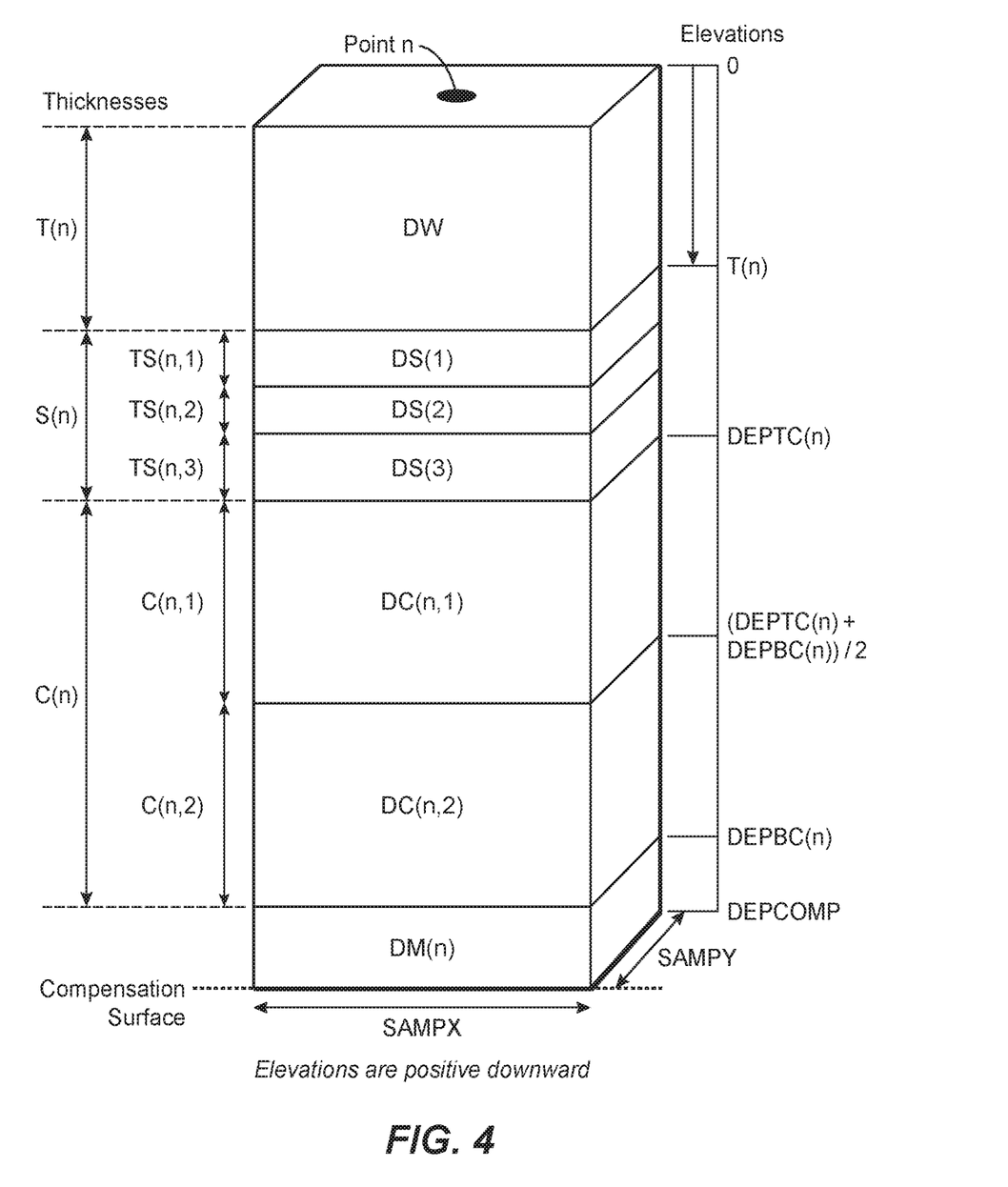
FIG. 4 illustrates an exemplary lithospheric column.

Step 5 involves creating a lithospheric column centered at location n. FIG. 4 illustrates an exemplary lithospheric column, which can be formed from a series of 3D right-rectangular prisms that are stacked on top of one-another. The width of the column in the direction of the profile is SAMPX, while the width in the direction that is perpendicular to the profile is SAMPY. SAMPY can be set to a very large number, i.e. $10E^{11}$, which essentially allows the column to be two-dimensional.

Each offshore lithospheric column can include the following:
1) A top located at elevation=0.
2) A water layer with its bottom located at elevation T. The density of the layer is DW.
3) A sediment layer of thickness S with its bottom located at DEPTC (S may be zero in which case DEPTC=T). The sediment layer may have several sublayers, each with its own density DS(j), so that sediment density variations with depth can be modeled. Vertically variable sediment densities allow calculated gravity anomalies that are more consistent with nature than those obtained using a single sedimentary density. Sediment sublayer densities may also vary laterally. The bulk sediment density used for isostatic calculations is the mean sublayer density (weighted for sublayer thicknesses) for the respective column. The bulk sediment density may be different at each value n because bulk density is dependent on sediment thickness which may vary from point to point. Sedimentary densities could potentially be solved for during inversion but we choose to hold them constant because they are typically reasonably well constrained and the inversion is more efficient if they are not varied.

4) A crustal layer with top DEPTC and base DEPBC, which may have one or more sublayers. Typically, two sublayers are used to represent the "upper" and "lower" crust, these terms being common in geological literature. Each sublayer has its own density value DC(i,j,k) so that vertical crustal density changes can be addressed during gravity modeling. Vertically variable crustal densities allow calculated gravity anomalies which are more consistent with nature than those obtained using a single crustal density. The bulk crustal density used for isostatic calculations is the weighted mean value (weighted for sublayer thicknesses) of the crustal sublayer densities. Equation (9) is used to determine what the value of C and hence DEPBC is. Density values for the crustal prisms which make up a column are assigned based on the value of n and the LZONE information from Step 4).

5) A mantle layer with top and bottom elevations DEPBC and DEPCOMP, respectively. While this layer could be broken into sublayers, there is little reason for doing so from a geological point of view. The density of the layer is DM(i,k) and this value is assigned based on the value of n and the LZONE information from Step 4).

Each onshore lithospheric column can include the following.

1) A top located at elevation=T.
2) Same as 3) for the offshore case.
3) Same as 4) for the offshore case except that equation (4) is used to determine what the values of C and hence DEPBC are.
4) Same as 5) for the offshore case.

Detailed Discussion of Step 6

Figure 5:
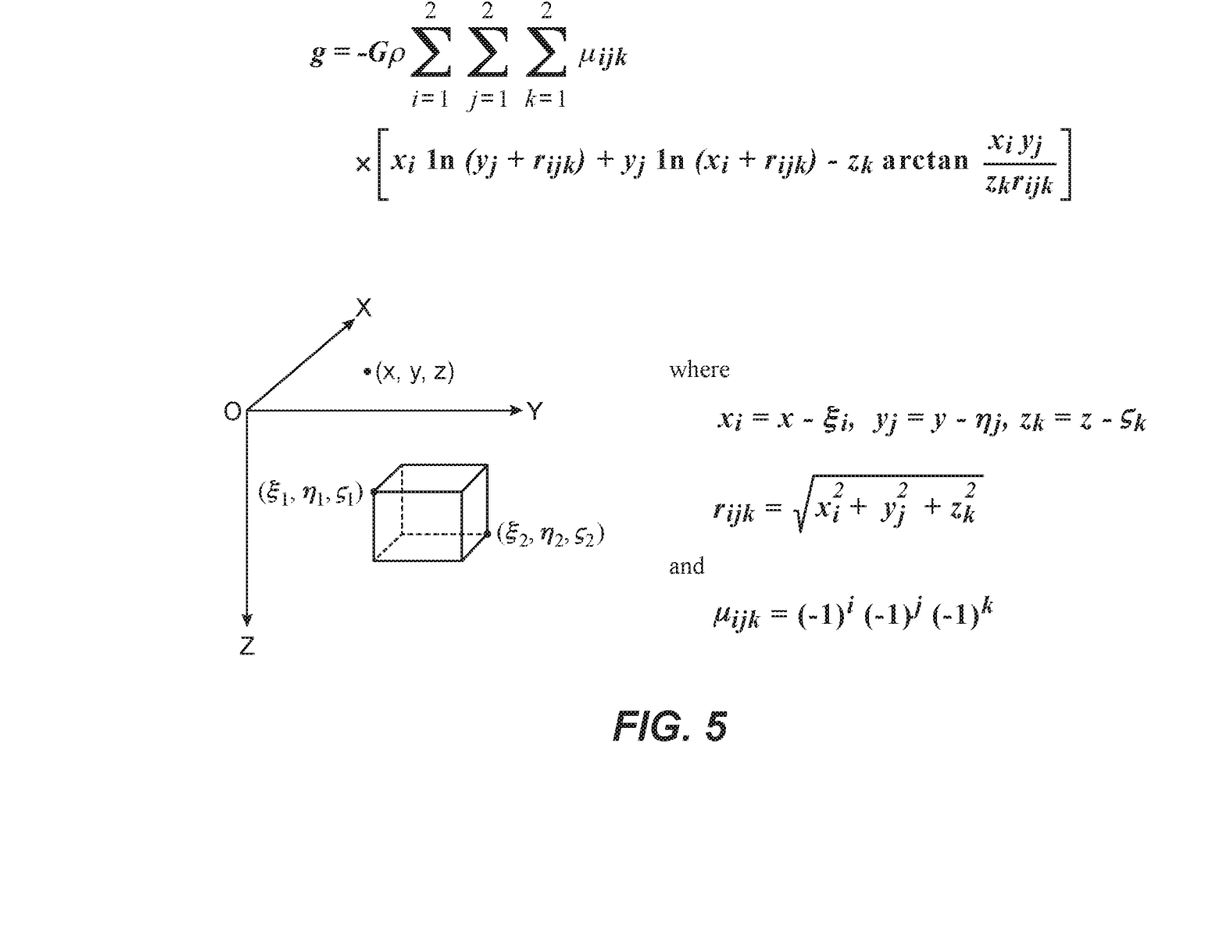
FIG. 5 illustrates a right-rectangular prism and an equation for the gravity anomaly produced by the right-rectangular prism. g is the gravity anomaly observed at location (x, y, z), and (ξ, η, ζ) are body coordinates in the x, y and z directions, respectively. G is the universal gravitational constant, and ρ is the density of the prism. From Li and Chouteau, 1998.

The equation for the gravity anomaly produced by a right-rectangular prism is shown in FIG. 5 (Li and Chouteau, 1998). The right-rectangular prism was chosen as a source element because it is simple, has a closed-form gravity solution, and can be used for both 2D and 3D analysis. It is also consistent with what is needed for isostatic calculations. This equation is used to calculate the gravity anomaly produced by each prism within a lithospheric column and the individual contributions are summed at each location n. The process is repeated for all NPNT columns and anomalies produced by all of the columns are summed at each location n. The result is the calculated gravity anomaly vector CALG(n) which is the sum of the anomalies produced by all prisms in all columns which comprise the model. The widths of the two columns on the edges of the model are made very large (10E11) to minimize edge effects.

Further Enhancements

As discussed above, the present technological advancement can be extended to three-dimensions. The extension of the 2D method described above to 3D would be straightforward to those of ordinary skill in the art light of the present disclosure. Local isostatic calculations are performed in a 1D sense, and the prisms used to calculate gravity anomalies are already 3D bodies which have been parameterized to represent 2D bodies. Input topography, crustal depths, and gravity data could be supplied as grids, and lithospheric zone boundaries could be input as lines for the 3D case, rather than as points as is done for 2D.

In reality, the lithosphere has rigidity so that local isostasy provides only an approximation of the geometry of the base of the crust. The effects of rigidity can be modeled using flexural filtering of the base of crust surface. For flexural filtering, an elastic thickness, infill density, and other parameters must be input (Watts, 2001). The elastic thickness, which is directly related to rigidity, can be incorporated in the inversion and hence solved for as is done for the other parameters of interest.

The global inversion methodology used with the present technological advancement falls under the category of "enumerative or grid search techniques" of Sen and Stoffa (1995). The forward gravity calculation that is used in this advancement is non-linear (FIG. 5). For the geophysical inverse problem that is being addressed in the present technological advancement, the objective function (RMSD) will have many local minima. An objective of the global optimization is to find the smallest value of RMSD, or the global minimum, in the presence of multiple local minima. Enumerative or grid-search methods of inversion involve the systematic search through each point in a predefined model space to locate the best fit model(s). This method is akin to Monte Carlo inversion. Using a true Monte Carlo type approach does have advantages and is useable with the present technological advancement. Monte Carlo methods are pure random search methods in which models are drawn uniformly at random and tested against data. In a Monte Carlo inversion, each model parameter is allowed to vary within a predefined search interval (determined a priori) (Sen and Stoffa, 1995). Moreover, other inversion techniques can be used with the present technological advancement.

The statistical analysis of solutions described above was limited to calculating means, medians, and standard deviations. However, the present technological advancement is not limited to these statistical techniques. Other statistical techniques can be used with the present technological advancement, including Baysian probability (Sen and Stoffa, 1995).

Examples

The following synthetic example illustrates a non-limiting example of the present technological advancement. A lithospheric cross section (FIG. 6), which is in perfect GLI equilibrium, was created and used to generate synthetic gravity data. The model in FIG. 6 includes five sedimentary sublayers 604A-E, two crustal sublayers 606A and 606B, and three lithospheric zone boundaries (611, 612, and 613) which separate four lithospheric zones (1, 2, 3, 4). The mantle was assigned a density of 3.30 g/cm$^3$ in each of the four lithospheric zones. The synthetic gravity data were then inverted using the present technological advancement. Known inputs to the inversion included: the densities of the water, sedimentary and mantle layers, as well as the depth to the top of the crust. The locations of zone boundaries were also input to the inversion. What was solved for in this example was the depth to the base of the crust DEPBC 607, the reference crustal thickness CREF and the reference crustal density DCREF, as well as the densities of the upper and lower sublayers for each crustal zone. Trial values for these parameters were:

CREF=34000, 38000, and 42000 m

Figure 6:
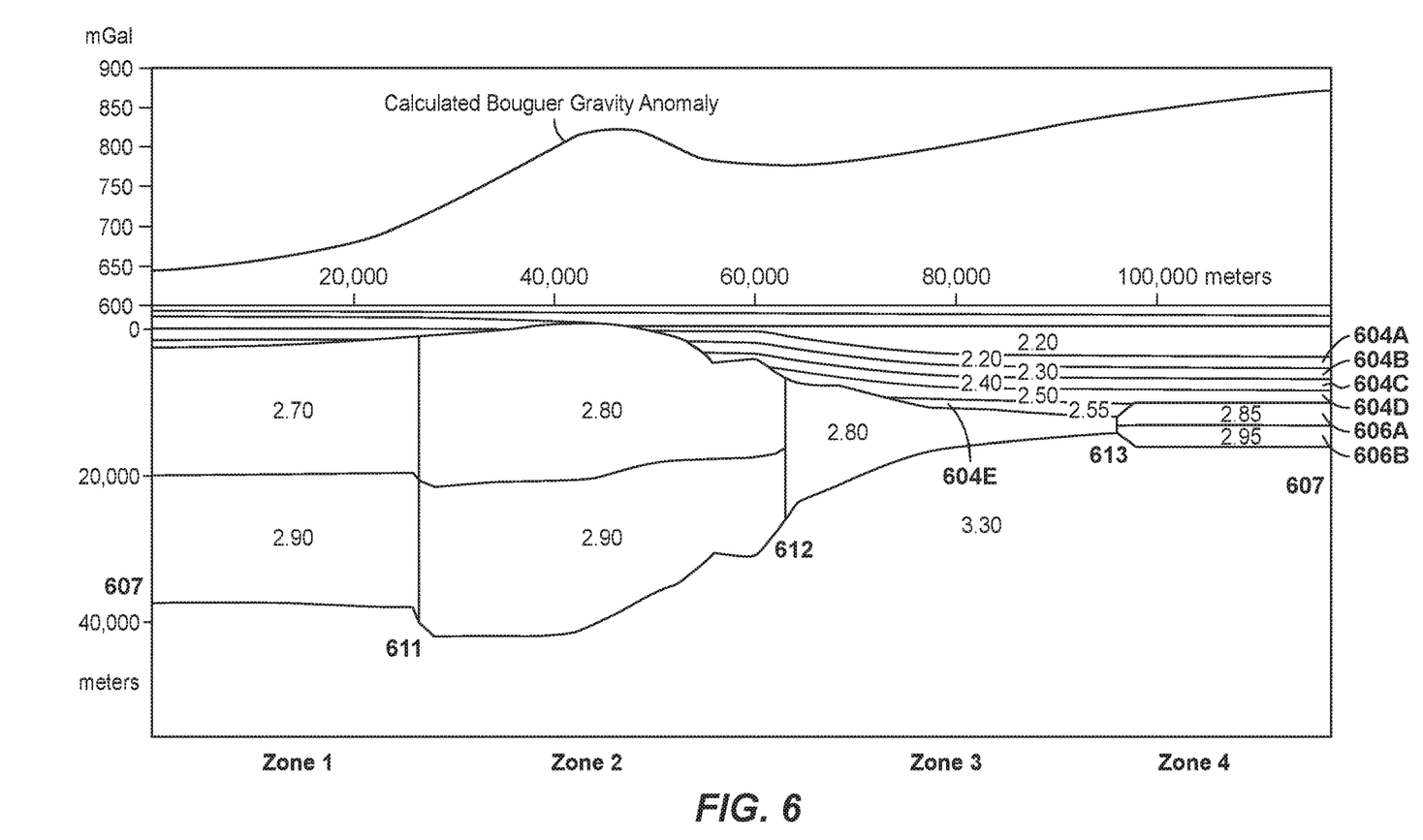
FIG. 6 illustrates a lithospheric cross-section of a model used to create synthetic data for an exemplary application of the present technological advancement.

DCREF=function of DC(2,1,1 through 4) and DC(2,2,1 through 4)

Figure 7:
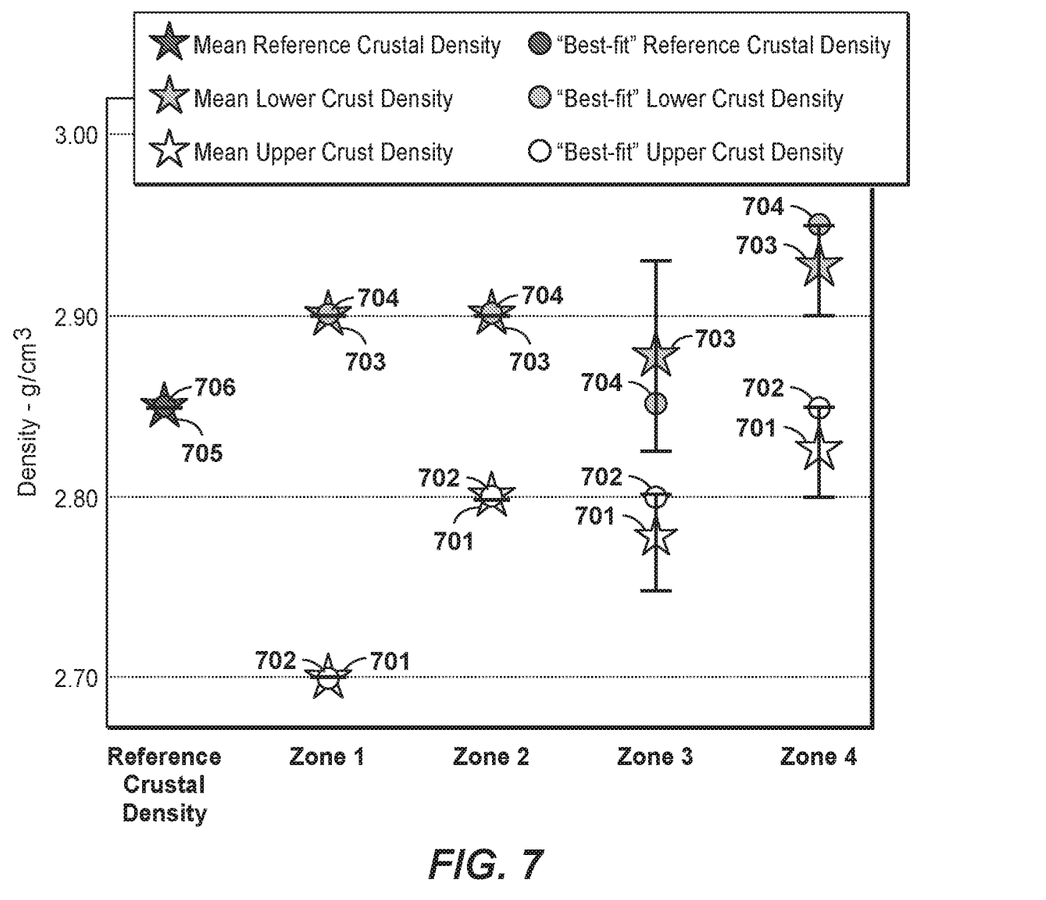
FIG. 7 illustrates an exemplary statistical presentation of results for the twenty best solutions, in terms of lowest rms difference between observed and calculated gravity anomalies.

DC(1,1,1 through 4)=2.70, 2.75, 2.80, 2.85 g/cm³
DC(1,2,1 through 4)=2.80, 2.85, 2.90, 2.95 g/cm³
DC(2,1,1 through 4)=2.70, 2.75, 2.80, 2.85 g/cm³
DC(2,2,1 through 4)=2.80, 2.85, 2.90, 2.95 g/cm³
DC(3,1,1 through 4)=2.70, 2.75, 2.80, 2.85 g/cm³
DC(3,2,1 through 4)=2.80, 2.85, 2.90, 2.95 g/cm³
DC(4,1,1 through 2)=2.80, 2.85 g/cm³
DC(4,2,1 through 2)=2.90, 2.95 g/cm³ and the and best fit reference crustal density is 706. Both have values of 2.85 g/cm3, which is the correct answer.

Figure 8:
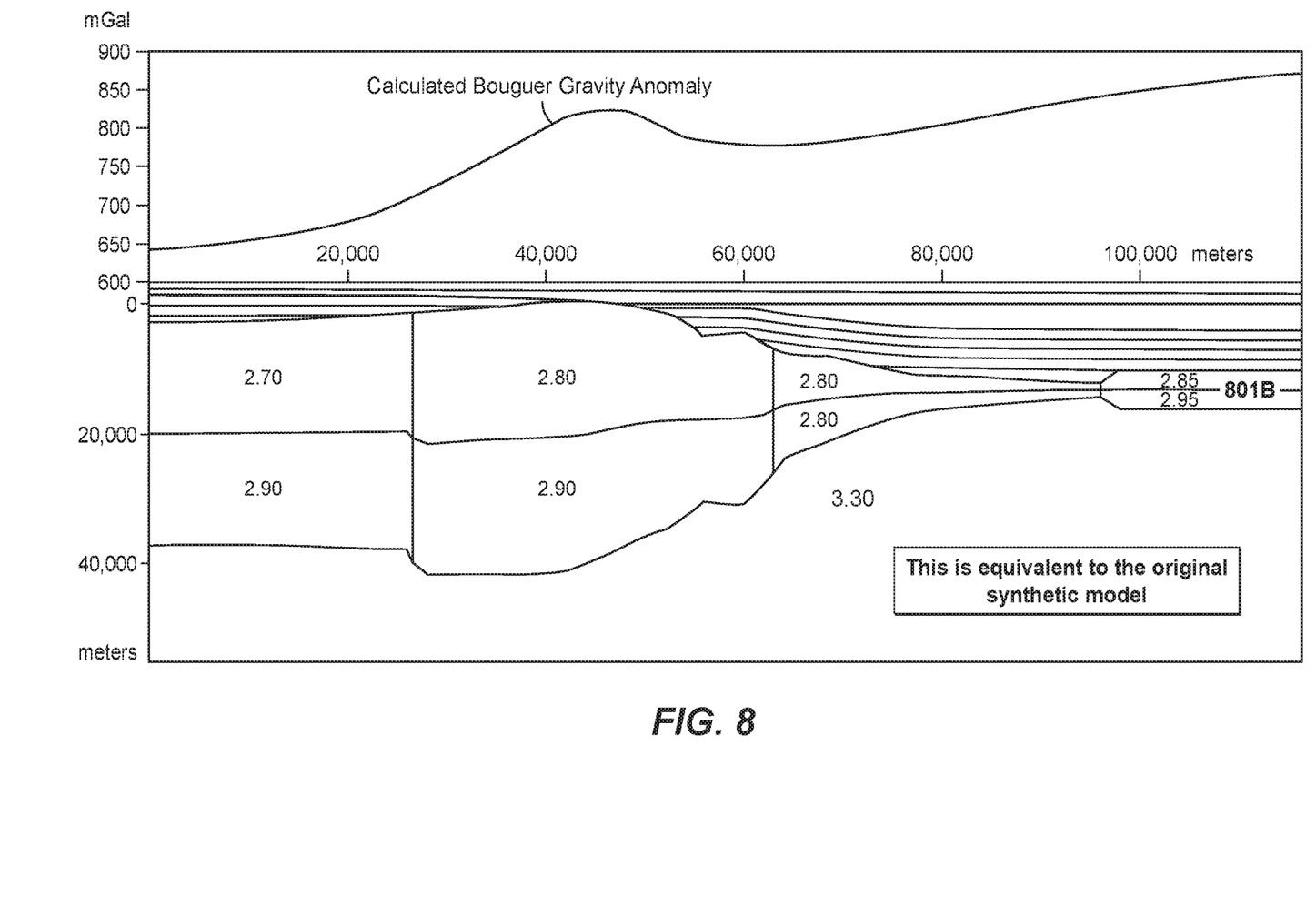
FIG. 8 is a trial model corresponding to the top ranked trial model in Table 1.

FIG. 8 illustrates the top ranked trial model from Table 1 and its gravity anomaly which is equivalent to the original synthetic model.

The present technological advancement can be used to manage hydrocarbons. As used herein, hydrocarbon management includes hydrocarbon extraction, hydrocarbon pro-

TABLE 1

| Rank | RMS Gravity Difference (mGal) | Reference Crustal Thickness (m) | Reference Crustal Density (g/cm³) | Mantle Density (g/cm³)* | Zone1 Upper Crustal Density (g/cm³) | Zone1 Lower Crustal Density (g/cm³) | Zone2 Upper Crustal Density (g/cm³) | Zone2 Lower Crustal Density (g/cm³) | Zone3 Upper Crustal Density (g/cm³) | Zone3 Lower Crustal Density (g/cm³) | Zone4 Upper Crustal Density (g/cm³) | Zone4 Lower Crustal Density (g/cm³) |
|---|---|---|---|---|---|---|---|---|---|---|---|---|
| 1 | 0.00 | 38000.00 | 2.85 | 3.30 | 2.70 | 2.90 | 2.80 | 2.90 | 2.80 | 2.80 | 2.85 | 2.95 |
| 2 | 0.04 | 38000.00 | 2.85 | 3.30 | 2.70 | 2.90 | 2.80 | 2.90 | 2.80 | 2.80 | 2.85 | 2.90 |
| 3 | 0.16 | 38000.00 | 2.85 | 3.30 | 2.70 | 2.90 | 2.80 | 2.90 | 2.80 | 2.80 | 2.80 | 2.95 |
| 4 | 0.16 | 38000.00 | 2.85 | 3.30 | 2.70 | 2.90 | 2.80 | 2.90 | 2.80 | 2.85 | 2.85 | 2.95 |
| 5 | 0.19 | 38000.00 | 2.85 | 3.30 | 2.70 | 2.90 | 2.80 | 2.90 | 2.80 | 2.85 | 2.85 | 2.90 |
| 6 | 0.19 | 38000.00 | 2.85 | 3.30 | 2.70 | 2.90 | 2.80 | 2.90 | 2.80 | 2.80 | 2.80 | 2.90 |
| 7 | 0.25 | 38000.00 | 2.85 | 3.30 | 2.70 | 2.90 | 2.80 | 2.90 | 2.75 | 2.95 | 2.85 | 2.90 |
| 8 | 0.26 | 38000.00 | 2.85 | 3.30 | 2.70 | 2.90 | 2.80 | 2.90 | 2.75 | 2.95 | 2.80 | 2.95 |
| 9 | 0.27 | 38000.00 | 2.85 | 3.30 | 2.70 | 2.90 | 2.80 | 2.90 | 2.75 | 2.95 | 2.85 | 2.95 |
| 10 | 0.27 | 38000.00 | 2.85 | 3.30 | 2.70 | 2.90 | 2.80 | 2.90 | 2.75 | 2.95 | 2.80 | 2.90 |
| 11 | 0.28 | 38000.00 | 2.85 | 3.30 | 2.70 | 2.90 | 2.80 | 2.90 | 2.80 | 2.85 | 2.80 | 2.95 |
| 12 | 0.30 | 38000.00 | 2.85 | 3.30 | 2.70 | 2.90 | 2.80 | 2.90 | 2.80 | 2.90 | 2.85 | 2.95 |
| 13 | 0.31 | 38000.00 | 2.85 | 3.30 | 2.70 | 2.90 | 2.80 | 2.90 | 2.80 | 2.85 | 2.80 | 2.90 |
| 14 | 0.32 | 38000.00 | 2.85 | 3.30 | 2.70 | 2.90 | 2.80 | 2.90 | 2.75 | 2.90 | 2.80 | 2.95 |
| 15 | 0.32 | 38000.00 | 2.85 | 3.30 | 2.70 | 2.90 | 2.80 | 2.90 | 2.75 | 2.90 | 2.80 | 2.90 |
| 16 | 0.33 | 38000.00 | 2.85 | 3.30 | 2.70 | 2.90 | 2.80 | 2.90 | 2.80 | 2.90 | 2.85 | 2.90 |
| 17 | 0.34 | 38000.00 | 2.85 | 3.30 | 2.70 | 2.90 | 2.80 | 2.90 | 2.75 | 2.90 | 2.85 | 2.90 |
| 18 | 0.36 | 38000.00 | 2.85 | 3.30 | 2.70 | 2.90 | 2.80 | 2.90 | 2.75 | 2.90 | 2.85 | 2.95 |
| 19 | 0.41 | 38000.00 | 2.85 | 3.30 | 2.70 | 2.90 | 2.80 | 2.90 | 2.80 | 2.90 | 2.80 | 2.95 |
| 20 | 0.42 | 38000.00 | 2.85 | 3.30 | 2.70 | 2.90 | 2.80 | 2.90 | 2.75 | 2.85 | 2.80 | 2.90 |

*Not solved for during inversion

The NSOL=20 trial models with the lowest rms differences between observed and calculated gravity anomalies for the synthetic data example are shown in Table 1. The correct solution was properly ranked number 1 with an RMSD value=0 because one of the trial models was equivalent to the actual model. For synthetic data there may be one but only one correct solution because all trial models have a unique set of parameters. Most interesting are the parameter values associated with the solutions ranked 2-20. The ranking of the solutions is generally similar to the qualitative closeness of the trial models to the actual model. Models ranked 2 through 5 have only one incorrect parameter and solutions 6 and 7 have two incorrect values, etc. The reference crustal thickness and reference crustal density values, as well as the upper and lower crustal densities for zones 1 and 2 are correct for all of the top twenty solutions. Note that the variability of crustal densities is greatest in zones with the thinnest crust. This is because crustal density has less impact on gravity anomaly amplitude as the volume of crust becomes smaller. Accordingly, crustal density estimates obtained using this approach will tend to be more robust in areas where crustal thickness is not minimal.

A statistical presentation of results for the NSOL=20 best trial models in terms of lowest RMSD values, is shown in FIG. 7. Circles correspond to densities of the best-fit solution (trial model with the lowest RMSD value). Stars correspond to mean density values for the NSOL=20 best trial models. Standard deviations for the NSOL=20 trial models are shown by bars. The mean upper crustal densities are 701, the best-fit upper crustal densities are 702, the mean lower crustal densities are 703, and the best-fit lower crustal densities are 704. The mean reference crustal density is 705 duction, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Computer Hardware

In all practical applications, the present technological advancement must be used in conjunction with a computer, programmed in accordance with the disclosures herein. Preferably, in order to efficiently perform inversion, the computer is a high performance computer (HPC), as it is known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The present techniques may be susceptible to various modifications and alternative forms, and the examples discussed above have been shown only by way of example. However, the present techniques are not intended to be limited to the particular examples disclosed herein. Indeed,

REFERENCES

The following references are hereby incorporated by reference in their entirety:

Li, X, and Chouteau, M., 1998, Three-dimensional gravity modeling in all space, Surveys in Geophysics 19: pp 339-368.

Sen, M. and Stoffa, P. L., 1995, Global optimization methods in geophysical inversion, Advances in Exploration Geophysics 4, Elsevier Science B.V.; preface, pp 13-15, 35, 67.

Watts, A. B., 2001, Isostasy and Flexure of the Lithosphere, Cambridge University Press; Chapters 1, 2, 4 and 5.

What is claimed is:

1. A method, comprising:
defining a model space within which all subsurface models are in general local isostatic equilibrium such that within each subsurface model one or more of a crustal density, a mantle density, and a depth to a top and base of the crust vary laterally while local isostatic equilibrium is maintained;
generating a representative set of trial models which span the model space where each trial model has a unique set of parameter values and provides a scenario of Earth's crustal geometry and crust and mantle rock properties, and wherein generating each of the trial models comprises creating a lithospheric column that is in general local isostatic equilibrium, where the lithospheric column comprises a crustal layer having a crustal thickness (C) determined using the following equation:

$$C = C_{ref} - T - S - [C_{ref}(\rho_{cref} - \rho_c) + T\rho_c - S(\rho_s - \rho_c)]/(\rho_{mref} - \rho_c)$$

wherein
$C_{ref}$ is the thickness of the crust at a reference location;
T is the vertical distance between Earth's rock surface and sea level;
S is the vertical thickness of sedimentary section of the Earth;
$\rho_s$ is the density of sediment;
$\rho_c$ is the density of crust;
$\rho_{cref}$ is the density of the crust at the reference location; and
$\rho_{mref}$ is the density of the mantle at the reference location; and
determining, within an inversion process, a solution for the model space based on minimizing a misfit between observed gravity anomaly data and synthetic gravity anomaly data generated from the set of trial models.

2. The method of claim 1, wherein the lithospheric column further includes a top and a water layer, wherein the water layer is formed as a prism.

3. The method of claim 1, wherein the lithospheric column is an offshore lithospheric column.

4. The method of claim 1, wherein the lithospheric column is an onshore lithospheric column.

5. The method of claim 1, wherein crust thickness, densities for crust sublayers and zones, densities for mantle zones, thickness of a reference crust, and density of the reference crust are solved for during the inversion process.

6. The method of claim 1, wherein a thickness of the sedimentary section of the Earth, densities for crust sublayers and zones, densities for mantle zones, thickness of a reference crust, and density of the reference crust are solved for during the inversion process.

7. The method of claim 1, further comprising: determining lateral density contrasts in Earth's crust and mantle.

8. The method of claim 1, wherein the inversion process, for the trial models, includes determining a root mean square difference between the calculated gravity anomalies and the observed gravity anomaly, and using the difference to rank the trial models.

9. A method comprising:
defining a model space within which all subsurface models are in general local isostatic equilibrium such that within each subsurface model one or more of a crustal density, a mantle density, and a depth to a top and base of the crust vary laterally while local isostatic equilibrium is maintained;
generating a representative set of trial models which span the model space where each trial model has a unique set of parameter values and provides a scenario of Earth's crustal geometry and crust and mantle rock properties, and wherein generating each of the trial models comprises creating a lithospheric column that is in general local isostatic equilibrium, where the lithospheric column comprises a sediment layer having a sediment thickness (S) determined using the following equation:

$$S = [C_{ref}(\rho_{cref} - \rho_c) - T(\rho_w - \rho_c) - M(\rho_m - \rho_c)]/(\rho_s - \rho_c)$$

wherein
$C_{ref}$ is the thickness of the crust at a reference location;
T is the vertical distance between Earth's rock surface and sea level;
M is the vertical distance between the top of the mantle and the depth to the top of the mantle at the reference location;
$\rho_s$ is the density of sediment;
$\rho_w$ is the density of water;
$\rho_c$ is the density of crust;
$\rho_{cref}$ is the density of the crust at the reference location; and
$\rho_m$ is the density of the mantle; and
determining, within an inversion process, a solution for the model space based on minimizing a misfit between observed gravity anomaly data and synthetic gravity anomaly data generated from the set of trial models.

10. The method of claim 9, wherein the lithospheric column further includes a top and a water layer, wherein the water layer is formed as a prism.

11. The method of claim 9, wherein the lithospheric column is an offshore lithospheric column.

12. The method of claim 9, wherein the lithospheric column is an onshore lithospheric column.

13. The method of claim 9, wherein crust thickness, densities for crust sublayers and zones, densities for mantle zones, thickness of a reference crust, and density of the reference crust are solved for during the inversion process.

14. The method of claim 9, wherein a thickness of the sedimentary section of the Earth, densities for crust sublayers and zones, densities for mantle zones, thickness of a reference crust, and density of the reference crust are solved for during the inversion process.

15. The method of claim 9, further comprising: determining lateral density contrasts in Earth's crust and mantle.

16. The method of claim 9, wherein the inversion process, for the trial models, includes determining a root mean square difference between the calculated gravity anomalies and the observed gravity anomaly, and using the difference to rank the trial models.

\* \* \* \* \*